United States Patent [19]
McConnell

[11] Patent Number: 5,094,494
[45] Date of Patent: Mar. 10, 1992

[54] SPRING LOCK COUPLING

[75] Inventor: William W. McConnell, Hagerstown, Ind.

[73] Assignee: Ford Motor Company, Dearborn, Mich.

[21] Appl. No.: 547,363

[22] Filed: Jul. 2, 1990

[51] Int. Cl.$^5$ ............................................. F16L 39/02
[52] U.S. Cl. ................................... 285/318; 285/341; 285/351
[58] Field of Search .................. 285/318, 351, 341, 39

[56] References Cited

U.S. PATENT DOCUMENTS

| | | | |
|---|---|---|---|
| 2,914,344 | 11/1959 | Anthes | 285/321 X |
| 2,921,801 | 1/1960 | Beyer | 285/318 X |
| 2,939,728 | 6/1960 | Bitel | 285/318 X |
| 3,532,101 | 10/1970 | Snyder | 285/318 X |
| 4,055,359 | 10/1977 | McWethy | |
| 4,401,326 | 8/1983 | Blair | |
| 4,632,434 | 12/1986 | Proctor et al. | |
| 4,728,130 | 3/1988 | Corzine | |
| 4,750,762 | 6/1988 | Corzine | |
| 4,805,943 | 2/1989 | Balsells | 285/318 |
| 4,872,710 | 10/1989 | Konecny et al. | 285/318 X |

FOREIGN PATENT DOCUMENTS

| | | | |
|---|---|---|---|
| 161486 | 1/1953 | Australia | 285/318 |
| 946580 | 8/1956 | Fed. Rep. of Germany | 285/318 |

Primary Examiner—Randolph A. Reese
Assistant Examiner—Heather Chun
Attorney, Agent, or Firm—Charles H. Ellerbrock; Roger L. May

[57] ABSTRACT

The present invention relates to a tubular coupling comprising a first tube having an end portion; a cage means disposed on the end portion and including a radial base portion through which the end portion projects, a first circular flange portion connected at one end thereof to the radial base portion and angularly inclined outwardly from the end portion, a curved wall portion connected to the first circular flange portion and partially forming an annular chamber, and a second circular flange portion connected to the curved wall portion and terminating in radially spaced relation to an outer surface of the end portion of the first tube. The coupling also includes a way of retaining the cage on the end portion of the first tube to hold the cage against axial displacement. A second tube having an end portion is telescopically mounted on the end portion of the first tube. The end portion of the second tube includes a ramp portion adjacent the terminal end of the second tube and is angularly disposed relative to the longitudinal axis of the second tube; and a further portion adjacent to the ramp portion which is inwardly angularly disposed toward the longitudinal axis of the second tube. The end portion of the second tube partially projects into the space between the surface of the end portion of the first tube and the cage. A spring is disposed within the cage interposed between the further portion of the second tube and the second circular flange portion, thereby preventing telescopic disengagement of the second tube from the first tube. Finally there is a seal disposed between the end portion of the first tube and the end portion of the second tube for preventing leakage between the respective end portions.

18 Claims, 1 Drawing Sheet

SPRING LOCK COUPLING

BACKGROUND OF THE INVENTION

1. Field of the Invention

The present invention relates to a spring lock or quick-connect tubular coupling for a pair of tubes one of which has an end portion telescopically disposed within an end portion of the other.

2. Discussion of the Related Art

In many automotive, household appliance and machine tool applications, fluid conduits or tubes that carry pressurized fluids must be capable of being disconnected to permit repair or replacement of components of the system.

U.S. Pat. No. 4,055,359 to McWethy discloses a quick-connect tubular coupling which facilitates initial connection and subsequent disconnection of the pair of tubes. McWethy was a key contribution to the art enabling manual connections of fluid pressure lines (100–300 psi) in a few seconds by using (i) a radially outwardly flared lip to expand and pass a garter spring thereby and (ii) a cage to retain the spring in the passed condition.

Specifically, McWethy utilizes an annular cage externally mounted on the inner tube in axially spaced relation to the free end of its end portion. The cage is held on the inner tube against axial displacement. The end portion of the outer tube is flared outwardly at its free end and is adapted to extend into the cage. A circular spring means is interposed between the flared end portion of the other tube and the cage and is disposed to prevent axial movement of one tube relative to the other. Between the telescoped end portions are a plurality of o-rings that are compressed in a sealed mode to prevent leakage through the coupling.

Assembly of the McWethy patent '359 is difficult in that the spring must be forced radially outwardly by the outwardly flared end portion until the spring expands to an extent greater than the diameter of the flared end. After this point is reached, the outer tube can continue its movement and the spring can then contact to a point such that it becomes interposed between the opposite side of the flare and the cage flange. This assembly requires substantial force to be exerted on the two tube ends to overcome the force required to expand the spring over the flared end. In locations where the open area is small, such as in some regions of an engine compartment, it can be difficult to make the connection because of the mechanical forces required to expand the spring.

Further the o-rings can be dry and this can also make a proper connection more difficult to obtain due to the additional frictional forces which have to be overcome as the two tube Portions are forced together.

Another problem with the McWethy patent '359 is that the spring may be able to come out of the cage when the two members are not connected. This happens in the McWethy design because part of the spring can bend past the cage flange and allow the entire spring to fall out. This causes increased manufacturing time for replacing the missing spring or even can cause a faulty connection for springs which are missing and not replaced when the "connection" is attempted.

Thus with McWethy's device two significant problems remained: (1) assurance that the manual connection has been made and remains properly made, and (2) reducing the loads to be overcome manually, which is critical when working in limited access spaces. The art, in attempting to improve upon McWethy, was concerned only with the first aspect. Blair (U.S. Pat. No. 4,401,326) provided visible indicator of proper connections. Proctor (U.S. Pat. No. 4,632,434) made the connecting assembly from more simplified stock components; and Corzine (U.S. Pat. Nos. 4,728,130 and 4,750,762) provided split collets to relieve the deformable sealing means after connection. But the art continued to use the same general construction of McWethy which inherently demanded a relatively high level of manual exertion to achieve the quick connection.

SUMMARY OF THE INVENTION

It is an object of the present invention to provide a spring lock coupling which is easy to assemble even in areas of limited space.

It is a further object of the present invention to prevent the spring from coming out of the cage when the coupling is not connected.

It is still a further object of the present invention to provide a spring lock coupling that can utilize the disconnect tools presently on the market.

It is still a further object of the present invention to provide a spring lock coupling which has no rotary orientation requirement thereby allowing the hose assembly to neutralize all torsional stresses in the system.

It is yet a further object of the present invention to provide a spring lock coupling which is economical and uncomplicated to manufacture.

The above and other objects of the present invention are accomplished by a tubular coupling comprising a first tube having an end portion; a cage means disposed on the end portion and including a radial base portion through which the end portion projects, a first circular flange portion connected at one end thereof to the radial base portion and angularly inclined outwardly from the end portion, a curved wall portion connected to the first circular flange portion and partially forming an annular chamber, and a second circular flange portion connected to the curved wall portion and terminating in radially spaced relation to an outer surface of the end portion of the first tube. The coupling also includes a way of retaining the cage on the end portion of the first tube against axial displacement. A second tube having an end portion is telescopically mounted on the end portion of the first tube. The end portion of the second tube includes a ramp portion adjacent the terminal end of the second tube and is angularly disposed relative to the longitudinal axis of the second tube; and a further portion adjacent to the ramp portion which is inwardly angularly disposed toward the longitudinal axis of the second tube. The end portion of the second tube partially projects into the space between the surface of the end portion of the first tube and the cage. A spring is disposed within the cage interposed between the further portion of the second tube and the second circular flange portion of the cage, thereby preventing telescopic disengagement of the second tube from the first tube. Finally there is a seal disposed between the end portion of the first tube and the end portion of the second tube for preventing leakage between the respective end portions.

The objects are also accomplished by the quick-connect coupling for first and second telescopable tubes which are fluidly sealable in the telescoped condition. The assembly comprises a cage having a closed face secured to the first tube and an open face arranged to receive the second tube when telescoped onto the first tube. Resilient means are annularly entrained within the cage and are effective to normally apply a radially inwardly gripping force to the first tube. There is also a double flared means on the end of the second tube presenting a first inwardly flared inclined surface to radially outwardly expand the resilient means as the second tube is moved in one axial direction to enter the cage and a second but oppositely inclined outwardly flared surface to permit retraction of the resilient means about the second tube as the second tube is further advanced into the cage. The first inclined surface makes an included angle with the longitudinal axes of the tubes in the range of 10°-30° and this eases assembly.

BRIEF DESCRIPTION OF THE DRAWINGS

The invention will now be described further, by way of example, with reference to the accompanying drawings, in which.

DETAILED DESCRIPTION OF THE PREFERRED EMBODIMENTS

Figure 1:
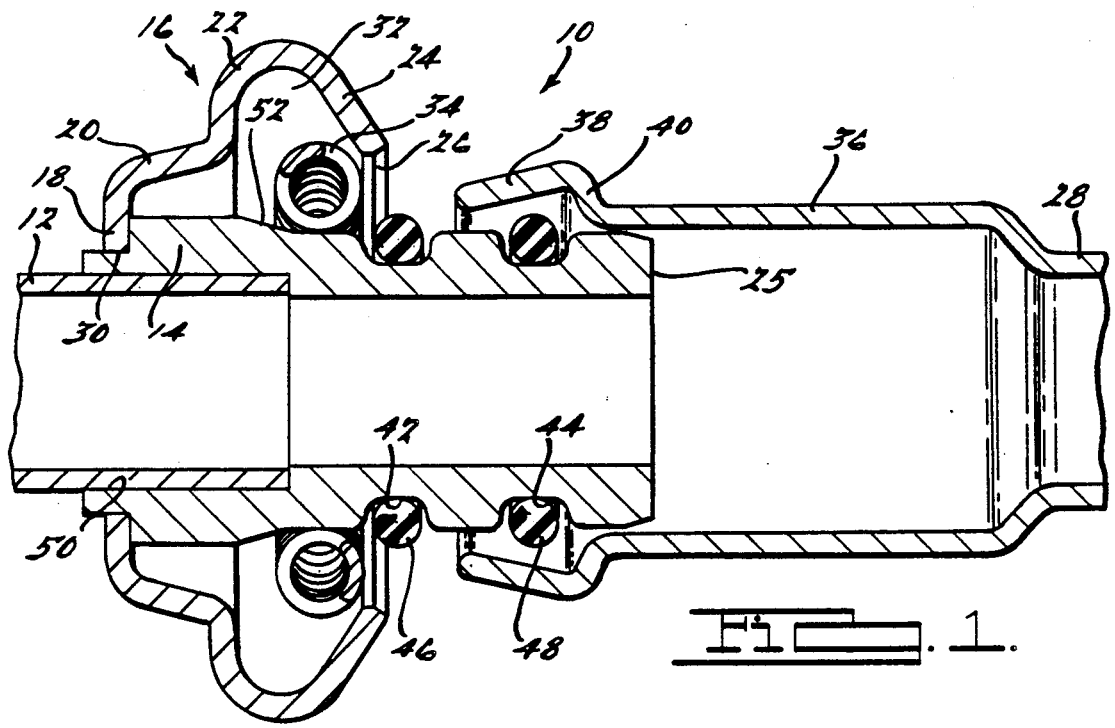
FIG. 1 is a sectional assembly view of the spring lock coupling of the present invention illustrating the parts of the coupling at the beginning of the assembly.
Figure 2:
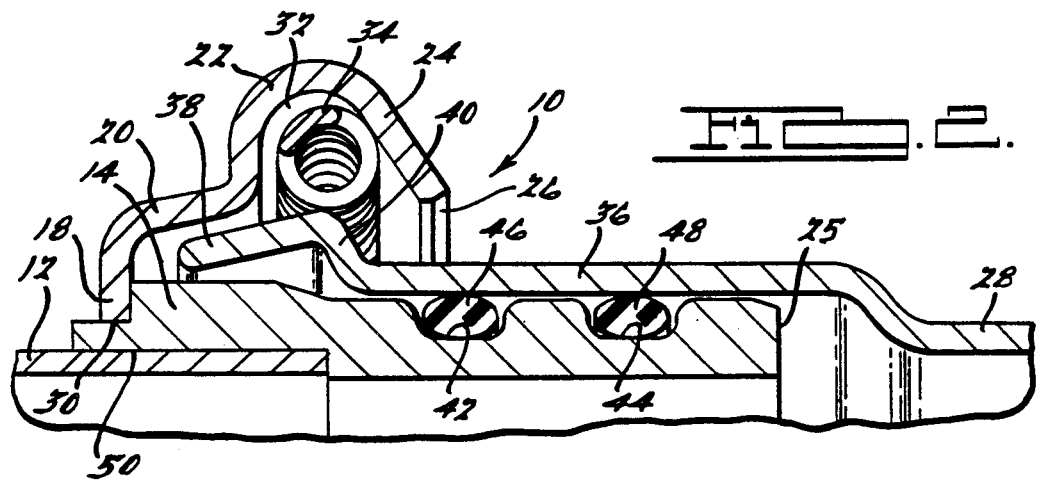
FIG. 2 is a view in part similar to FIG. 1 illustrating the relationship of the coupling parts with the spring fully expanded prior to achieving the fully assembled position.
Figure 3:
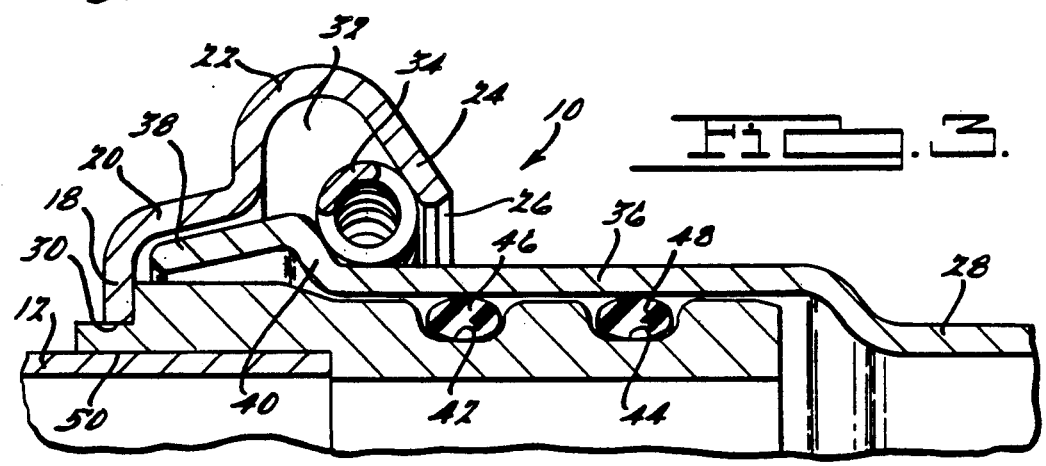
FIG. 3 is a view in part similar to FIGS. 1 and 2 illustrating the spring lock coupling in its fully assembled position according to the present invention.

FIGS. 1-3 disclose a spring lock coupling 10 and the method of assembling the coupling 10. The coupling 10 includes a first tube 12 having an end portion or male fitting 14 connected thereto.

A cage 16 is attached to the end portion 14 of the first tube 12 by a radial base portion 18. The cage also includes a first circular flange portion 20, a curved wall portion 22 and a second circular flange portion 24. The first circular flange portion 20 is connected to the radial base portion 18 and is angularly inclined outwardly from the end portion 14. The curved wall portion 22 is connected to the first circular flange portion 20 and connected to the curved wall portion 22 is the second circular flange portion 24 which is angularly inclined toward the terminal end of the end portion 14.

The second circular flange 24 ends at such a point that there is an access opening 26 which allows a portion of the second or outer tube 28 to be introduced thereinto.

The cage 16 is attached at the radial base portion 18 to the end portion 14 of the first tube 12 by a brazed alloy 30. Other types of connections are also possible, such as welding, soldering, crimping to form beads, etc and are well within the knowledge of one skilled in the art.

The cage 16 defines an annular space 32 around the end portion 14 of the first tube 12. The curved wall portion 22 defines the largest diameter location of the annular space 32. Located inside the annular space 32 and normally disposed on the outer surface of the end portion 14 is a garter spring 34 which is capable of holding the coupling 10 together.

The second tube 28 includes an end portion 36 which is slightly enlarged from the diameter of the second tube 28. At the terminal end of the end portion 36 is a ramp portion 38 which is angularly disposed relative to the longitudinal axis of the second tube 28. A further portion 40 is adjacent to the ramp portion 38 and is inwardly angularly disposed back toward the longitudinal axis of the second tube 28.

The end portion 14 of the first tube 12 includes o-ring grooves 42 and 44 which are capable of receiving o-rings 46 and 48, respectively, for sealingly preventing leakage between the two tubes 12 and 28. It is contemplated that other sealing means could be substituted for the o-rings and possibly even the o-ring grooves. One example would include rubber coating the outer diameter of the end portion 14 and the inner diameter of the end portion 36 so that when the two ends were coupled, there was a sealing interference fit therebetween.

The end portion 14 is connected to the first tube 12 by a brazed alloy connection 50. Once again other possible types of connections are contemplated as discussed above. It is also possible for the end portion 14 to be integral with the first tube as disclosed in the McWethy patent and this disclosure is incorporated herein by reference.

The assembly of the coupling will now be described with reference to FIGS. 1-3. FIG. 1 illustrates the initial stage of assembly. The end portion 36 of the second tube 28 is telescopically arranged over the terminal end 25 of the end portion 14 of the first tube 12. The second tube continues toward the left, as shown in FIG. 1, to a location where the ramp portion 38 contacts the garter spring 34. Because the ramp portion 38 is angled relative to the longitudinal axis of the second tube 28 and the initial contact point of the ramp portion 38 with the garter spring 34 is at the end of the ramp portion 38. The end of the ramp portion 38 has a diameter slightly smaller than the annulus of the spring centerline in its resting position of FIG. 1. This allows the ramp portion 38 to assist the garter spring 34 to expand with a minimized effort. Enlarging of the garter spring 34 happens upon further movement of the second tube 28 to the left relative to the first tube 12 until a point where the garter spring 34 reaches the end of the ramp portion 38 as shown in FIG. 2. Any further leftward movement of the tube 28 causes the spring 34 to contract as it slides down the outwardly flared portion 40 until the point where the garter spring 34 is cradled between (i) the flat section of the end portion 36, (ii) the portion 40 and (iii) the second circular flange portion 24 of the cage 16 as shown in FIG. 3. This is the fully connected position for the coupling 10.

The ramp portion 38 assists in connecting the coupling 10 because the spring is able to ride up along the ramp portion 38 and gradually expand rather than having to expand to its widest point initially as previously done by the McWethy design. This fact aids in making the connection even in areas of limited space.

This ease in assembly has been found to be related to the specific ramp angle of radially inwardly flared ramp portion 38 relative to the longitudinal axis of the tubes 12, 28. It is preferred that this angle be in the range of 10°-30° and preferably around 12°.

As will be seen clearly from the drawings the inclined surface of the portion 40 of the tube 28 makes an angle with the longitudinal axis of the tube 28 which is substantially the same as the angle made to the same axis by the second circular flange portion 24 on the cage 16. The spring 34, in the connected condition of the coupling 10 illustrated in FIG. 1, is thus confined between substantially parallel surfaces. In consequence, the reaction forces imposed on the spring at the points of contact with these two surfaces are diametrically opposite and there is no resultant force on the spring engendered by any force tending to separate the two members of the coupling 10. The security of the coupling is therefore not impaired by the pressure existing within the coupled tubes.

It has been found that the angle of radially outwardly flared portion 40 and the second circular flange portion 24 should be selected such that the spring 34 is prevented, under normal conditions, from rising up over the second circular flange portion 24 following assembly. To accomplish this goal, angles between 57° and 85° can be used and preferably around 60°.

As additional protection of the coupling 10, the angles of the first circular flange portion 20 on the cage 16 and the ramp portion 38 are intended to be substantially the same. In the assembled position, these surfaces contact each other and protect the coupling 10 against separation especially due to side loading.

The present invention also prevents the garter spring 34 from coming out of the cage 16 when the coupling 10 is apart or not yet connected because the o-rings 46 and 48 have been located closer in toward the cage 16 then prior art couplings. It has been found that by disposing the o-rings such that at least one of them is laterally disposed adjacent the access opening 26, the garter spring 34 is prevented from falling out of the cage when the coupling is not connected.

The disassembly operation of the coupling 10 may be accomplished by tools commercially available for other spring lock couplings. One such tool is described in the McWethy patent.

The materials for the coupling can be selected from those well known to those skilled in the art. Specific materials which can be utilized include low carbon steel, aluminum and plastics.

The present invention has been described with reference to certain preferred embodiments and those skilled in the art, in view of the present disclosure, will appreciate that numerous alternative embodiments of the invention are within the scope of the following claims.

What is claimed is:

1. A tubular coupling comprising:
   a first tube having an end portion with a terminal end, said end portion being connected to said first tube;
   a cage means disposed on said end portion of said first tube, said cage means including:
      a radial base portion having a circular aperture through which said end portion of said first tube projects;
      a first circular flange portion connected at one end thereof to said radial base portion and angularly inclined outwardly from said end portion of said first tube toward the terminal end;
      a curved wall portion connected to said first circular flange portion, said curved wall portion partially forming an annular chamber; and
      a second circular flange portion connected to said curved wall portion and angularly inclined toward said end portion of said first tube in the general direction of said terminal end, said second circular flange terminating in radially spaced relation to an outer surface of said end portion of said first tube;
   means for retaining said cage means on said end portion of said first tube to hold said cage means against axial displacement;
   a second tube having an end portion telescopically mounted on said end portion of said first tube, said end portion of said second tube including:
      a ramp portion having a first end and a second end, said ramp portion being adjacent a terminal end of said second tube, said ramp portion also being angularly disposed relative to the longitudinal axis of said second tube such that said first end of said ramp portion adjacent to the terminal end of said second tube is closer to said first tube than the second end of said ramp portion; and
      a further portion having a first end and a second end, said further portion being adjacent to said ramp portion, said further portion also being inwardly angularly disposed toward the longitudinal axis of said second tube such that said first end of said further portion adjacent said ramp portion is further from said first tube than said second end of said further portion;
   said end portion of said second tube partially projects into the space between the surface of said end portion of said first tube and said cage means when the first and second tube end portions are in engagement;
   a spring means disposed within said cage means interposed between said further portion of said second tube and said second circular flange portion, thereby preventing telescopic disengagement of said second tube from said first tube when the first and second tube end portions are in engagement; and
   sealing means disposed between said end portion of said first tube and said end portion of said second tube for preventing leakage between said end portions.

2. A tubular coupling as defined in claim 1, wherein said end portion of said first tube is integral with said first tube.

3. A tubular coupling as defined in claim 1, wherein said cage means is disposed on said end portion of said first tube in an axially inwardly spaced relation to said terminal end thereof.

4. A tubular coupling as defined in claim 1, wherein said retaining means engages with said radial base portion of said cage means.

5. A tubular coupling as defined in claim 1, wherein said further portion of said second tube makes an angle with the longitudinal axis of said second tube which is substantially the same as the angle made to the longitudinal axis of said second tube by said second circular flange portion of said cage means.

6. A tubular coupling as defined in claim 1, wherein said spring means comprises an expandable garter spring.

7. A tubular coupling as defined in claim 1, wherein said retaining means is formed by beads in said end portion of said first tube.

8. A tubular coupling as defined in claim 1, wherein said retaining means is brazed alloy disposed between said cage means and said end portion of said first tube.

9. A tubular coupling as defined in claim 1, wherein, said sealing means comprises at least one o-ring which is laterally disposed adjacent to said second circular flange portion of said cage means.

10. A tubular coupling comprising:
    a first tube having an end portion with a terminal end, said end portion being connected to and integral with said first tube;

a cage means disposed on said end portion of said first tube in an inwardly spaced relation to said terminal end, said cage means including:
- a radial base portion having a circular aperture through which said end portion of said first tube projects;
- a first circular flange portion connected at one end thereof to said radial base portion and angularly inclined outwardly from said end portion of said first tube toward the terminal end;
- a curved wall portion connected to said first circular flange portion, said curved wall portion partially forming an annular chamber; and
- a second circular flange portion connected to said curved wall portion and angularly inclined toward said end portion of said first tube in the general direction of said terminal end, said second circular flange terminating in radially spaced relation to an outer surface of said end portion of said first tube;

means for retaining said cage means on said end portion of said first tube to hold said cage means against axial displacement;

a second tube having an end portion telescopically mounted on said end portion of said first tube, said end portion of said second tube including:
- a ramp portion having a first end and a second end, said ramp portion being adjacent a terminal end of said second tube, said ramp portion also being angularly disposed relative to the longitudinal axis of said second tube such that said first end of said ramp portion adjacent to the terminal end of said second tube is closer to said first tube than the second end of said ramp portion; and
- a further portion having a first end and a second end, said further portion being adjacent to said ramp portion, said further portion also being inwardly angularly disposed toward the longitudinal axis of said second tube such that said first end of said further portion adjacent said ramp portion is further from said first tube than said second end of said further portion;

said end portion of said second tube partially projects into the space between the surface of said end portion of said first tube and said cage means when the first and second tube end portions are in engagement;

a spring means disposed within said cage means interposed between said further portion of said second tube and said second circular flange portion, thereby preventing telescopic disengagement of said second tube from said first tube when the first and second tube end portions are in engagement; and sealing means disposed between said end portion of said first tube and said end portion of said second tube for preventing leakage between said end portions.

11. A tubular coupling as defined in claim 10, wherein said further portion of said second tube makes an angle with the longitudinal axis of said second tube which is substantially the same as the angle made to the longitudinal axis of said second tube by said second circular flange portion of said cage means.

12. A tubular coupling as defined in claim 10, wherein, said sealing means comprises at least one o-ring which is laterally disposed adjacent to said second circular flange portion of said cage means.

13. A tubular coupling comprising:
a first tube having an end portion with a terminal end, said end portion being connected to and integral with said first tube;
a cage means disposed on said end portion of said first tube in an inwardly spaced relation to said terminal end, said cage means including:
- a radial base portion having a circular aperture through which said end portion of said first tube projects;
- a first circular flange portion connected at one end thereof to said radial base portion and angularly inclined outwardly from said end portion of said first tube;
- a curved wall portion connected to said first circular flange portion, said curved wall portion partially forming an annular chamber; and
- a second circular flange portion connected to said curved wall portion and angularly inclined toward said end portion of said first tube in the general direction of said terminal end, said second circular flange terminating in radially spaced relation to an outer surface of said end portion of said first tube;

means for retaining said cage means on said end portion of said first tube to hold said cage means against axial displacement, said retaining means being formed by beads in said end portion of said first tube;

a second tube having an end portion telescopically mounted on said end portion of said first tube, said end portion of said second tube including:
- a ramp portion adjacent the terminal end of said second tube, said ramp portion being angularly disposed relative to the longitudinal axis of said second tube; and
- a further portion adjacent to said ramp portion, said further portion being inwardly angularly disposed toward the longitudinal axis of said second tube;

said end portion of said second tube partially projects into the space between the surface of said end portion of said first tube and said cage means;

a garter spring disposed within said cage means interposed between said further portion of said second tube and said second circular flange portion, thereby preventing telescopic disengagement of said second tube from said first tube; and o-rings disposed between said end portion of said first tube and said end portion of said second tube for preventing leakage between said end portions.

14. A tubular coupling as defined in claim 13, wherein at least one of said o-rings is laterally disposed adjacent to said second circular flange portion of said cage means.

15. In a quick-connect coupling for the first and second telescopable tubes which are fluidly sealable in the telescoped condition, the assembly comprising:
a) a cage having a closed face secured to said first tube and an open face arranged to receive said second tube when telescoped onto said first tube;
b) resilient means annularly entrained within said cage and effective to normally apply a radially inwardly gripping force to said first tube; and
c) means on the end of said second tube presenting double flared surfaces to sequentially expand and retract said resilient means as said tube is moved in one axial direction to enter said cage, said means on the end of said second tube includes a first inclined surface to radially outwardly expand said resilient means as said second tube is moved in one axial direction to enter said cage and includes a second but oppositely inclined surface to permit retraction of said resilient means about said second tube as said second tube is further advanced into said cage, said first inclined surface making an included angle with the longitudinal axes of said tubes in the range of 10°-30°, and said cage includes a surface which is substantially parallel and adjacent to said first inclined surface of said second tube, said second inclined surface making an included angle with the longitudinal axes of said tubes in the range of 57°-85°.

16. A quick-connect coupling as defined in claim 15, wherein said first inclined surface makes an included angle with the longitudinal axes of said tubes of about 12°.

17. A quick-connect coupling as defined in claim 15, wherein said second inclined surface makes an included angle with the longitudinal axes of said tubes of about 60°.

18. A quick-connect coupling as defined in claim 15, wherein said first tube includes o-rings disposed thereon with at least one of said o-rings being laterally disposed adjacent to said open face of said cage.

* * * * *